Feb. 9, 1971     E. J. HOFFMAN     3,562,649

METHOD FOR REDUNDANT TIME MEASUREMENT

Filed June 12, 1968

ERIC J. HOFFMAN
INVENTOR

BY J. O. Tresansky
ATTORNEY

United States Patent Office 3,562,649
Patented Feb. 9, 1971

3,562,649
METHOD FOR REDUNDANT TIME MEASUREMENT
Eric J. Hoffman, Baltimore, Md., assignor, by mesne assignments, to the United States of America as represented by the Secretary of the Navy
Filed June 12, 1968, Ser. No. 736,432
Int. Cl. G04f 9/00
U.S. Cl. 324—181            6 Claims

ABSTRACT OF THE DISCLOSURE

A period of time is measured by generating a plurality of noise signals by means of a plurality of independent white Gaussian noise generators, by band-limiting each noise signal with suitable filters, by summing the noise signals emergent from said filters, and finally by amplitude-limiting the sum signal, thereby producing a signal whose amplitude and number of zero-crossings are both independent of the number of noise generators employed. The elapsed time is measured by counting the zero crossings.

BACKGROUND OF THE INVENTION

(A) Field of the invention

The subject invention relates generally to the field of horology, and more particularly to a redundant system for generating timing signals useful in the measurement of elapsed periods of time.

(B) Description of the prior art

In many applications, a large number of which are in the satellite field, it is desired not only to measure an elapsed period of time, but to do so in a redundant manner. By employing redundant circuitry, the malfunctioning of one clock, for example, does not incapacitate the system in which such clock forms an integral part. One manner of realizing a redundant clock system is to sum the outputs from two sine wave oscillators and to count the resultant zero-crossings, the positive-going crests, or any other of a large number of regular occurrences. One difficulty encountered in the use of redundant sine wave clock sources, however, is that unless the phase relationship between the two sine wave oscillators is precisely maintained, the output of the summing device will not be as desired and hence will bear only a slight relationship to the elapsed time. It therefore becomes obvious that the practitioner has the choice of either sacrificing redundant operation or of designing a highly complex phase-locking system for accurately maintaining the phase relationship between two sine wave oscillators.

SUMMARY OF THE INVENTION

The subject invention makes use of the principle that a band-limited white Gaussian noise generator ("white" inferring that the average amplitude of the noise within any given band of frequencies is constant) develops an output having an average number of zero-crossings for a give time interval. The subject invention further makes use of the principle that this average number of zero-crossings remains unchanged notwithstanding the parallel addition of any number of similarly band-limited, independ Gaussian noise sources. More particularly, the subject invention teaches that the output from a summing circuit which combines the outputs of any number of such independent Gaussian noise sources has an average number of zero-crossings in a given time interval which can easily be calculated; and therefore the subject invention teaches that redundancy can be incorporated into a system for measuring long time intervals without requiring complicated phase-locking subsystems.

It is therefore an object of the invention to provide a system for generating timing signals.

It is another object of the invention to provide a system for generating timing signals useful in the measurement of elapsed intervals of time.

It is a further object of the invention to provide a system for redundantly generating timing signals.

It is still another object of the invention to provide an incomplex system for redundantly generating timing signals.

It is yet a further object of the invention to provide an incomplex system for redundantly generating timing signals by utilizing the unique properties of band-limited noise.

These and other objects and many of the attendant advantages of the subject invention wil become more readily apparent when reference is made to the following description taken in conjunction with the accompanying drawings.

DESCRIPTION OF THE PREFERRED EMBODIMENTS

As noted above, there are many applications when it is necessary to mark the beginning and the end of a relatively long interval of time. As also noted above, it is desirable in many of these applications to protect against malfunctioning of the clock system by measuring time redundantly. The subject invention comprises a system and a method for simply and economically providing redundant timing signals to be used in measuring the duration of relatively long intervals of time.

The subject invention depends for its operation on the results of an article entitled "Mathematical Analysis of Random Noise" by S. O. Rice which appears in the January 1945 issue of the Bell System Technical Journal at page 55. This article, as the title implies, mathematically analyzes random noise and reaches as its conclusion the result that there are an average number of $$2\sqrt{\frac{f_b^3 - f_a^3}{3(f_b - f_a)}}$$

zero-crossings per second in a band-limited noise train, where $f_a$ and $f_b$ equal, respectively, the lower and upper frequencies at which the noise train is band-limited. A noise train can be so band-limited by means of a band-pass filter which passes only frequencies between the limits of $f_a$ and $f_b$ Hertz. If desired, the noise-train can also be band-limited by means of a low-pass filter. Thus, when $f_a \to 0$ and $f_b \to W$, the above expression reduces to $2W/\sqrt{3}$, W being the upper limit of frequencies passed by the low-pass filter. What the above means, in effect, is that by knowing the characteristics of the filter employed, the average number of zero-crossings per second occurring in the band-limited noise train is easily determined. Then, by counting the number of zero-crossings occurring in any time period and by comparing this number with the calculated average number of zero-crossings per second, the elapsed time during the measured interval is easily determined. It should be obvious that the accuracy with which a time interval can be measured increases with the number of zero-crossings experienced during the interval. Therefore, the accuracy of a measurement can be set to any desired level by controlling the product of the time interval and the width of the band-limited frequency range.

Another principle of extreme importance in the operation of the subject invention is that any number of independent similarly band-limited white Gaussian noise sources can be added together without affecting the average number of zero-crossings which occur in a given time interval. This principle depends from the randomness of the noise sources. Therefore, by concentrating only upon the number of zero-crossings in a time interval, one cannot determine the number of band-limited Gaussian noise sources employed. The number of sources affects only the amplitude of the resultant sum signal—the amplitude being a proportional to $\sqrt{n}$, where $n$ is the number of band-limited noise sources employed.

Figure 1:
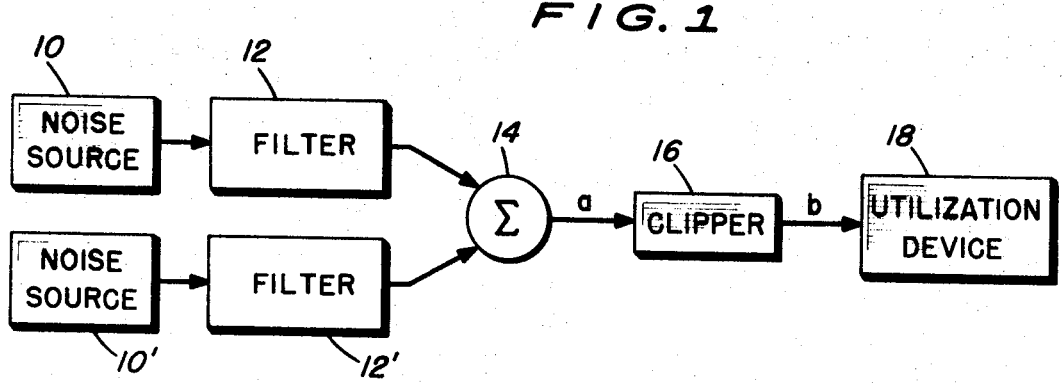
FIG. 1 is a block diagram of the redundant timing circuit contemplated by the subject invention.

Referring now to the drawings and particularly to FIG. 1, there is shown a block diagram of the redundant timing device of the subject invention. Two independent white Gaussian noise sources, or generators, are shown at 10 and 10', respectively. The noise source 10 is band-limited by causing the output from said source to pass through a low-pass filter 12; and similarly, the noise source 10' is band-limited by means of the low-pass filter 12'. (It should be remembered that the filters 12 and 12' can also be band-pass filters.) The output from the filter 12, as noted above, is a band-limited noise train and therefore has an average of $2W_1/\sqrt{3}$ zero-crossings per second, where $W_1$ is the cutoff frequency of the low-pass filter 12; and similarly, the output from the filter 12' is a band-limited noise train having an average number of $2W_2/\sqrt{3}$ zero-crossings per second where $W_2$ is the cutoff frequency of the low-pass filter 12'. For purposes of the present invention, the cutoff frequency of the low-pass filter 12 must equal the cutoff frequency of the low-pass filter 12'. (If band-pass filters are employed, they too, must be identical.) That is, the noise trains emergent from the filters 12 and 12', respectively, must have an equal average number of zero-crossings per second. The band-limited noise train emergent from filter 12 and the band-limited noise train emergent from filter 12' are added together in the summing circuit 14. As noted above, the output from the circuit 14 is a noise train having an average number of zero-crossings equal to $2W/\sqrt{3}$ per second, wherein W is the cutoff frequency common to both filters 12 and 12', and having an amplitude increased from that of either noise source 10 or noise source 10' by a factor of $\sqrt{n}$, where $n$ is the number of noise sources, here, two. For reasons explained below, the output from the summing circuit 14 is amplitude-limited in the clipper 16 and then passes to a utilization device 18. The utilization device can be any of a large number of possible devices which counts and records the number of zero-crossings occurring in an information-containing signal.

Figure 2:
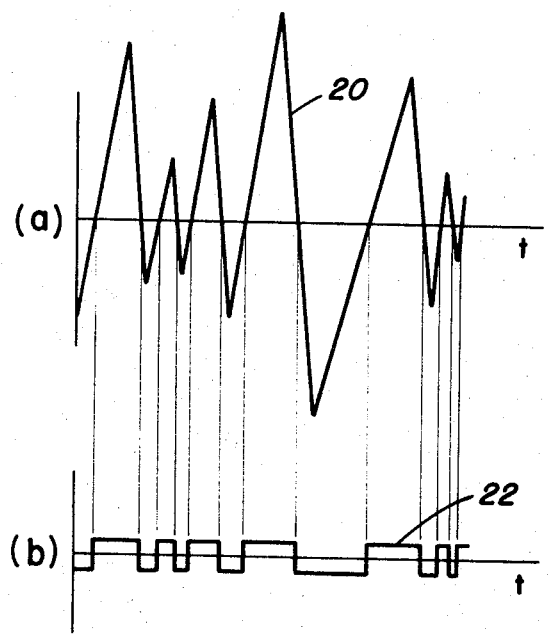
FIG. 2(a) is an amplitude versus time plot showing the output from the summing circuit of FIG. 1.
FIG. 2(b) is an amplitude versus time plot showing the output from the clipping stage of FIG. 1.

With reference now to FIG. 2(a), there is shown at 20 a plot of the band-limited noise train emergent from the summing circuit 14. While it is possible to feed this signal directly to the utilization device 18, it is desirable to eliminate entirely any dependence said signal might have upon the number of noise sources employed. More particularly, since the output from the summing circuit 14 is amplitude-dependent upon the number of noise sources in the circuit, the signal which would reach the utilization device 18 would not be entirely independent of the noise sources. However, by employing a clipper intermediate the summing circuit 14 and the utilization device 18, the noise train 20 is amplitude-limited in such a manner that the signal reaching the utilization device 18 is totally independent, both in average number of zero-crossings per second and in amplitude, of the number of noise sources employed. In FIG. 2(b), there is shown at 22 a plot of the output response of the clipper 16 when the input to the clipper 16 is a noise train such as that shown at 20 in FIG. 2(a). It is readily seen that amplitude variations in the waveform shown at 20 would not affect the output of the clipper 16 as represented by the waveform 22.

In summary, there has been disclosed a redundant timing circuit useful for measuring an extended interval of time by using a plurality of noise sources as the active elements in such a circuit.

It will be understood that the time-measuring circuit shown and the related method of measuring time described herein are subject to many modifications which may be obvious to those skilled in the art without departing from the spirit or scope of the invention. The disclosure herein is given for the purpose of illustration only; and it is desired that the protection afforded hereby be not limited thereto, but only to the extent set forth in the appended claims.

I claim:
1. A method for redundant time measurement which comprises:
generating a plurality of independent and redundant noise signals, each signal having an average number of zero-crossings in a given time interval,
filtering each of said plurality of noise signals in a band-limited manner, and
adding each of said plurality of filtered signals together to produce a resultant signal upon which a time base can rely, said resultant signal having an average number of zero crossings independent of the number of noise signals.

2. The method of redundant time measurement as claimed in claim 1 including the additional step of amplitude limiting said resultant signal thereby producing a signal whose average number of zero-crossings in a given time interval and also whose amplitude are both independent of the number of noise generators employed.

3. The method of redundant time measurement as claimed in claim 2 wherein said noise signals are produced by white, Gaussian noise generators.

4. The method of redundant time measurement as claimed in claim 3 wherein said band-limited filtering is accomplished by a low-pass filter.

5. The method of redundant time measurement as claimed in claim 3 wherein said band-limited filtering is accomplished by a band-pass filter.

6. The method of redundant time measurement as claimed in claim 4 wherein the number of zero crossings per second is equal to $$2W/\sqrt{3}$$

where W is the uppermost frequency limit.

References Cited
UNITED STATES PATENTS

| | | | |
|---|---|---|---|
| 2,851,596 | 9/1958 | Hilton | 324—68(C)UX |
| 2,953,780 | 9/1960 | Goldfischer | 331—78X |
| 3,243,585 | 3/1966 | Escobosa | 235—193X |
| 3,289,097 | 11/1966 | Martin | 331—56X |
| 3,456,208 | 7/1969 | Ratz | 331—78 |

ALFRED E. SMITH, Primary Examiner